Nov. 20, 1928.

J. L. PERKINS ET AL 1,692,566

WORK HOLDER

Original Filed Jan. 9, 1926

INVENTOR.
Julian L. Perkins,
Hiram L. Croft,
BY
Frank A. Cutter,
ATTORNEY.

Patented Nov. 20, 1928.

1,692,566

UNITED STATES PATENT OFFICE.

JULIAN L. PERKINS, OF WEST SPRINGFIELD, AND HIRAM D. CROFT, OF SPRINGFIELD, MASSACHUSETTS, ASSIGNORS, BY MESNE ASSIGNMENTS, TO PERKINS MACHINE AND GEAR COMPANY, OF SPRINGFIELD, MASSACHUSETTS, A CORPORATION OF MASSACHUSETTS.

WORK HOLDER.

Original application filed January 9, 1926, Serial No. 80,326. Divided and this application filed August 17, 1926. Serial No. 129,701.

Our invention relates to improvements in devices or appliances for holding work, such as hinge leaves, for example, in place while being cut, faced off, or machined, and consists essentially of a carrier, a female clamping block, a bearing block and a male clamping block in said female clamping block, a screw for operating said male clamping block, a hand-wheel mounted on said screw, and means to enable said hand-wheel to impart a "hammer" blow to said screw, all peculiarly constructed, arranged, and combined, together with such other parts and members as may be necessary or desirable in order to render the appliance or holder complete and serviceable in every respect, as hereinafter set forth in detail.

This work holder is a division of our application for U. S. patent on broaching machines filed January 9, 1926. Serial No. 80,326, patented Sept. 13, 1927, Patent No. 1,642,593.

The primary object of our invention is to provide for a machine, such as that which forms the subject of the aforesaid application, comparatively simple, convenient and easily operated, strong and durable, and withal highly efficient means to clamp and hold securely in place the work while being acted on by the cutting or broaching elements of said machine.

Another object is to produce a work holder, of this character which can readily be taken apart, and the parts of which can as readily be assembled. This is important because, for different kinds and sizes of work, it is necessary to change the clamping means of the holder to meet the varying conditions incident to the variation in the work.

A further object is to afford means for imparting a final impact to the clamping screw in tightening the same, and thus to insure against possible slipping of the work in the holder, and for starting said screw when tightened, without, in either case expending or exerting a great amount of manual force.

Other objects and advantages will appear in the course of the following description.

We attain the objects and secure the advantages of our invention by the mechanism illustrated in the accompanying drawings, in which—

Figure 1:
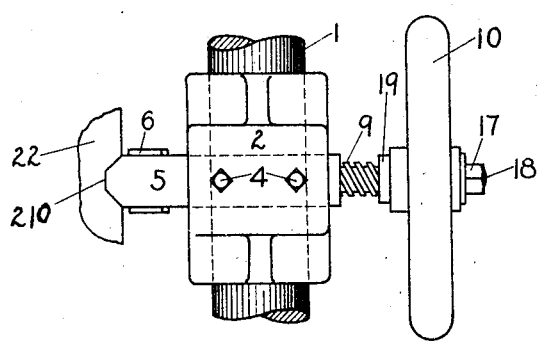
Figure 2:
Figure 3:
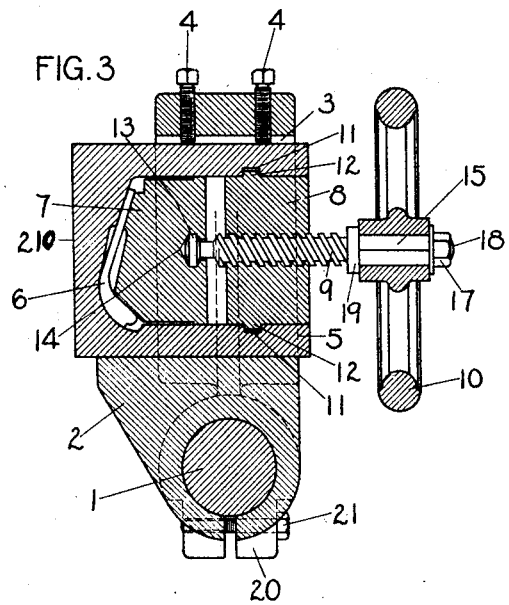
Figure 4:
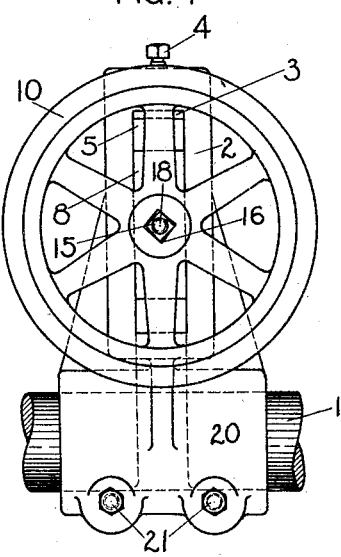

Figure 1 is a top plan of a work holder which embodies a practical form of our invention; Fig. 2, a front elevation of a piece of work adapted to be received and clamped in said holder; Fig. 3, a central, vertical section through the holder, taken on the plane of the hand-wheel axis, and, Fig. 4, a front elevation of the work holder.

Similar reference characters designate similar parts throughout the several views.

In the present example, the work holder is shown mounted on a rock shaft, as 1, inasmuch as it is necessary that the holder oscillate in the broaching machine hereinbefore referred to, but it is to be understood that the holder might be mounted for reciprocation into and out of operative position relative to the cutting elements of the machine in which the holder is embodied, and it is conceivable that the holder might be used always in a stationary position, that is to say, without being either oscillated or reciprocated.

The work holder illustrated in connection herewith is described as follows:

A carrier 2 has a rectangular opening 3 extending through the same from front to back. Fitting within the opening 3, and secured thereto by means of two bolts 4, is a female clamping block 5. The block 5 is bifurcated to form upper and under arms or extensions, and at the rear end inside is shaped to receive and support the convex side of a hinge leaf 6, the side edges of which leaf are to be broached or faced off. The block 5 is narrower than the leaf 6, in order to enable the latter to project at both longitudinal edges beyond the former. The free ends of the clamping-block arms are directed forwardly, the lower arm rests on the bottom of the opening 3, and the bolts 4, which are tapped into and through the top of the carrier 2, are screwed down tightly onto the top of the upper arm. A male clamping block 7 is slidingly located in the female clamping block 5, and adapted by position and construction to engage from the front the leaf 6 and hold the same in position in said female clamping block the rear end of said male clamping block being shaped to engage the concave side of said leaf. The block 7 does not project from the block 5.

As means for forcing the block 7 tightly against the leaf 6 and withdrawing said block from clamping position, a bearing block 8 and a screw 9 provided with a hand-wheel 10 are employed. In the inner sides of the female clamping-block arms are two transverse slots 11. The bearing block 8 fits between the arms of the block 5, and on the top and bottom of said bearing block are transverse ribs 12—12 which fit within the slots 11. By this means and in this manner the block 8 is held against displacement either forwardly or rearwardly in the block 5, and said block 8 is held against displacement laterally by the sides of the opening 3. The clamping block 7 also is held against lateral displacement by the sides of the opening 3. The screw 9 is tapped into and through the bearing block 8, and has at the rear end an enlargement or nut 13 that is received in a recess 14 in the clamping block 7, such recess being in the center of the front side of said clamping block, whereby the latter is moved forwardly or rearwardly by said nut, when said screw is rotated and according to the direction of rotation.

At the outer terminal of the screw 9 is a square head 15, and the hand-wheel 10 has a square opening 16 in the hub thereof, which opening is slightly larger than said head. The head 15 is received in the opening 16, and a check-nut 17 is screwed onto a screw-threaded projection 18 at the extreme front end of the screw 9, to retain the hand-wheel 10 in place on said head. The check-nut 17 prevents the hand-wheel 10 from being withdrawn from the head 15 in a forward direction, and a flange 19 on the screw 9 behind said head prevents said hand-wheel from moving rearwardly on said head.

In assembling the parts and members of this work holder, the bearing-block 8 is laterally inserted in place in the female clamping block 5, the latter is inserted in the opening 3, the screw 9 is introduced into said bearing block, said clamping block is positioned rearwardly in the carrier 2 far enough to enable the male clamping block 7 to be laterally inserted in said female clamping block, when the nut 13 is received in the opening or slot 14 prepared for the same in said male clamping block, which slot extends through from side to side of the latter block and opens through the front end thereof, and finally the female clamping block is drawn forwardly to the required extent in said carrier and secured by means of the bolts 4. The final position of the block 5 in the carrier 2 is such as will enable the work to be inserted, back of said carrier, between the two clamping blocks. It is assumed that the hand-wheel 10 has been mounted on the head 15, and the check-nut 17 screwed onto the projection 18.

When the screw 9 is rotated in one direction, it moves rearwardly or inwardly and carries with it the male clamping block 7, which slides in the space between the arms of the female clamping block 5, and, when said screw is rotated in the other direction, it moves forwardly or outwardly and carries with it said male clamping block. When the block 7 is moved forwardly by the screw 9 far enough to receive the leaf 6 in the space between the back end of said block and the adjacent surface of the block 5, said leaf is inserted sideways into such space, and then said screw is rotated in the direction to force said block 7 rearwardly into clamping engagement with said leaf. As already noted, the leaf 6 is wider than either the block 5 or the block 7, and said leaf must be arranged in said first-named block to project an approximately equal distance on both sides of the same, behind adjacent portions of the carrier 2. To release the leaf 6, the screw 9 is rotated in the direction to move forwardly with the block 7. When released the leaf can be removed sideways from the block 5.

The opening 16 is made larger than the head 15 for the purpose of enabling a sudden and comparatively powerful impulse or blow to be imparted by the hand-wheel 10, at the end of the rotation thereof in the direction to clamp the work in place, and against the beginning of the rotation thereof in the direction to release the work, in short, a "hammer" blow is or may be imparted by the hand-wheel at the end of the clamping operation, and again at the beginning of the unclamping operation.

For work of different shapes and sizes, different clamping blocks are required, but otherwise the work holder remains unchanged. Usually it is only the rear end of the male clamping block and the adjacent surface of the female clamping block that have to be changed in order to be accommodated to work of other shapes and sizes.

In the present case, the carrier 2 is provided at the bottom with a split sleeve 20 which is clamped onto the rock shaft 1 by means of two bolts 21. Upon loosening the bolts 20 the carrier 2 can be adjusted on the shaft 1, after which said bolts are again tightened.

As disposed in the drawings, the work holder is disposed vertically and in operative position. It is moved into inoperative position by being rocked forwardly or to the right on the shaft 1, so that the holder is disposed at an inclination. When the work holder is in operative position, the rear end portion 210 of the female clamping block 5 is usually received in a reciprocating, channeled member, such as one of the rams in the broaching machine of the aforesaid application, a fragmentary portion of which is represented at 22, in Fig. 1.

More or less change in the shape, size, construction, and arrangement of some or all of the parts of this work holder, in addition to those hereinbefore specifically pointed out, may be made, without departing from the spirit of our invention, or exceeding the scope of what is claimed.

What we claim as our invention, and desire to secure by Letters Patent, is—

1. A work holder, of the class described, comprising a carrier having a top, bottom, and sides, and an opening therethrough from front to back, a female clamping block receivable in said opening, said block having a part at the rear end to support the work, and an opening through the sides and front end, means to secure said block in said carrier, a bearing block in said first-named block, and provided with means to hold said bearing block against forward and backward movement, an operating screw in threaded engagement with said bearing block, and a male clamping block in said female clamping block, in front of said work-supporting part, said screw also being in engagement with said male clamping block and adapted when rotated to actuate said male clamping block toward or away from said work-receiving parts.

2. In a work holder, of the class described, a carrier having a top, bottom, and sides, and an opening therethrough from front to back, a female clamping block receivable and adjustable in said opening, and having a part at the front end to support the work, releasable means to secure said block in said carrier, a bearing block in said first-named block, an operating screw in threaded engagement with said bearing block, and a male clamping block in said first-named block back of said work-supporting part, said screw also being in engagement with said male clamping block and adapted when rotated to actuate said male clamping block toward or away from said work-receiving part.

3. In a work holder, of the class described, a carrier having a top, bottom and sides, and an opening therethrough from front to back, a female clamping block receivable in said opening, having at the rear end a part to support the work, and opening through the sides and front end, means to secure said block in said carrier, a bearing block adapted to be inserted laterally in said clamping block, and provided with means to engage said clamping block to hold said bearing block against endwise movement, an operating screw in threaded engagement with said bearing block, and a male clamping block insertable laterally in said female clamping block, in front of said work-supporting part, both said bearing block and said male clamping block being held against displacement laterally by said carrier, when said female clamping block is in place therein.

JULIAN L. PERKINS.
HIRAM D. CROFT.